United States Patent

Hill

[15] 3,678,239
[45] July 18, 1972

[54] INERT GAS SHIELDED ARC WELDING TORCHES

[72] Inventor: William G. Hill, London, England

[73] Assignee: Foster Wheeler Corporation, Livingston, N.J.

[22] Filed: April 20, 1970

[21] Appl. No.: 29,907

[30] Foreign Application Priority Data

April 21, 1969   Great Britain.....................20,310/69

[52] U.S. Cl. ............................................219/60 A, 228/45
[51] Int. Cl. .........................................................B23k 9/02
[58] Field of Search............219/60 R, 60 A, 125 R; 228/29, 228/45; 82/46

[56] References Cited

UNITED STATES PATENTS

| | | | |
|---|---|---|---|
| 3,102,187 | 8/1963 | Coscia | 219/60 A |
| 3,266,701 | 8/1966 | Peignen | 219/60 A |
| 3,268,708 | 8/1966 | Thomas | 219/60 A |

FOREIGN PATENTS OR APPLICATIONS

| | | | |
|---|---|---|---|
| 944,451 | 11/1961 | Great Britain | 219/60 A |

*Primary Examiner*—J. V. Truhe
*Assistant Examiner*—L. A. Schutzman
*Attorney*—John Maier, III, Marvin A. Naigur and John E. Wilson

[57] ABSTRACT

This invention describes an inert gas shielded electric arc welding torch for butt-welding tubes or tubular members of a wide range of outside diameters. The torch comprises a number of trolleys which are linked together and are spaced around the periphery of one tube. At least one trolley is provided with drive means and at least one trolley is produced with a welding head for making the butt-weld. All trolleys are constrained to follow a desired path by engagement with a track fitted around at least one tube. The torch is adjustable to suit differing sizes of tube or tubular member by altering the number of trolleys and/or by adjusting the spacing between them.

3 Claims, 14 Drawing Figures

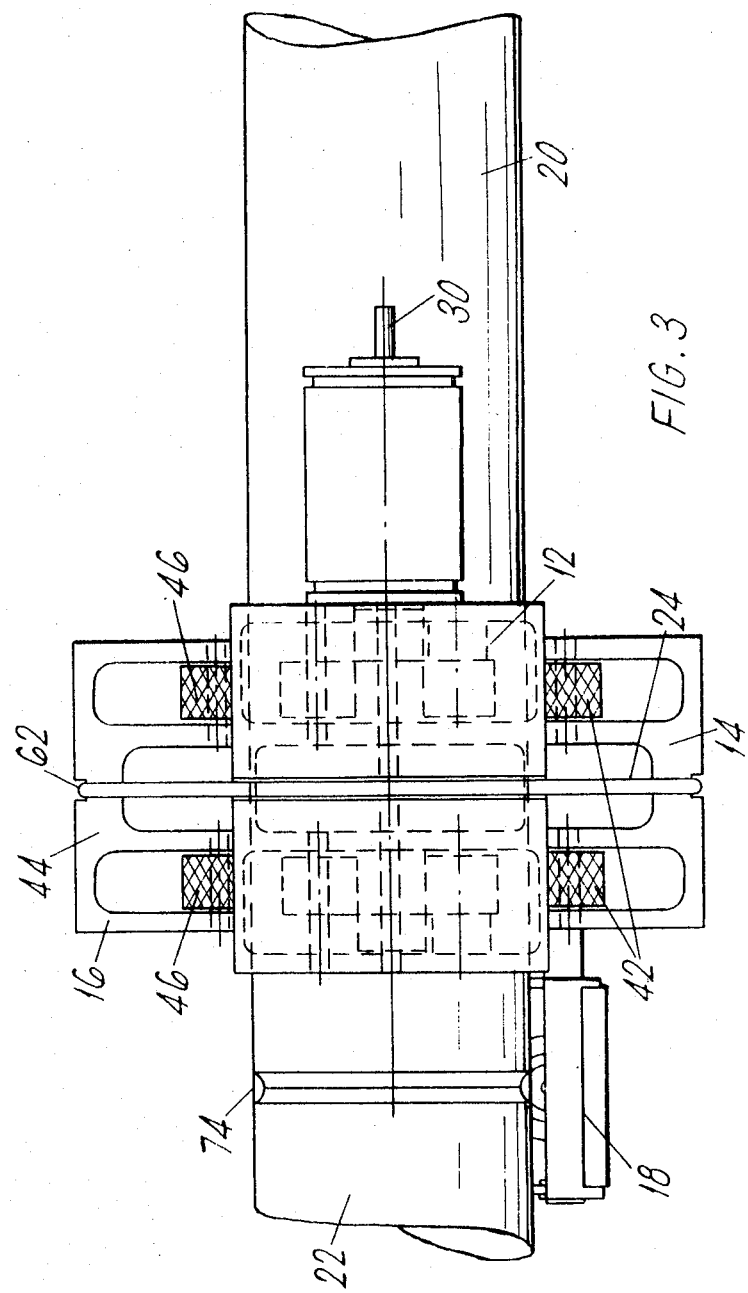

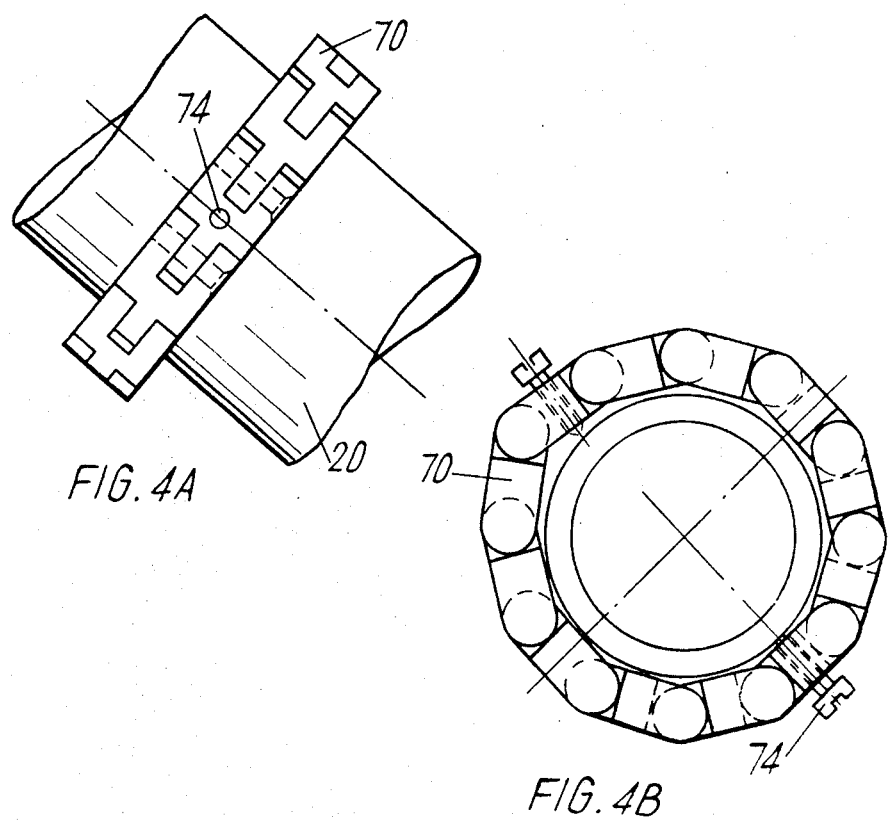
FIG. 4A
FIG. 4B
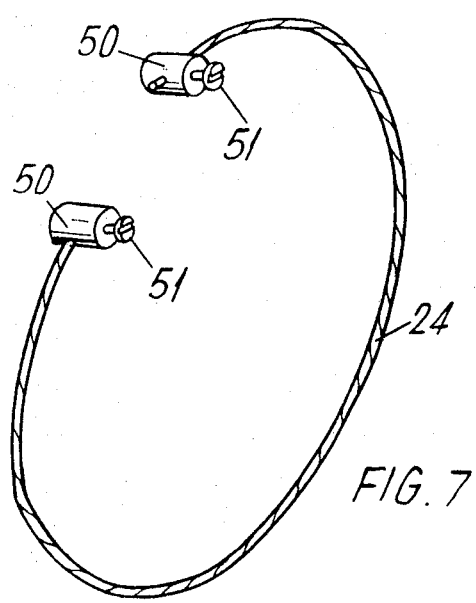
FIG. 7

INERT GAS SHIELDED ARC WELDING TORCHES

This invention relates to inert gas shielded electric arc welding torches and is particularly concerned with a torch which can be adapted to butt-weld tubes or tubular members of a wide range of diameters.

BACKGROUND TO THE INVENTION

Prior welding torches have been designed for a particular diameter of tube and although they may be capable of accepting some tolerance as between the tubes of the same nominal diameter they are normally unable to be used for a wide variety of sizes of tube. This means that a large number of torches are required, one for each diameter of tube to be welded. Naturally it would be an advantage to provide a torch which could be used on almost any diameter both from the point of view of having to provide only one torch instead of a large number and also for convenience in having a torch available for use with any diameter of tube.

The invention has therefore been made with this point in mind and it is an object of the invention to provide such a torch.

THE INVENTION

According to the invention there is provided a welding torch for making circumferential butt-welds between two tubes or tubular members comprising at least two trolleys which are linked together and spaced around the periphery of one of the tubes to be welded, at least one trolley being provided with drive means for driving all of the trolleys around the periphery of that tube during a welding operation, and at least one of the trolleys carrying a welding head, the trolleys being constrained to follow a desired path around the tubes by engagement with a track fitted around at least one of the tubes, and the welding head carrying an electrode, between which and the joint between the tubes to be welded, an electric arc can be struck for effecting the weld.

Such a torch can be readily adapted to fit various sizes of tubes either by increasing or decreasing the spacing between adjacent trolleys and/or by adding or removing trolleys. This, provided one always has at least one trolley carrying a welding head and at least one trolley carrying the drive means, one can have none or any additional number of idler trolleys i.e., trolleys which do not have drive means or carry a welding head.

In the simplest case, and this will be suitable for the smallest diameter tubes of say about one inch outside diameter, one might have two trolleys one of which is the drive trolley and the other of which carries the welding head. Alternatively of course one trolley may carry both the welding head and the drive means and the other trolley may be an idler trolley. With larger tubes one might have say three trolleys one carrying the welding head, one carrying the drive means and one being an idler trolley. With much larger tubes one might have additional idler trolleys.

It is very simple to adjust the size of the torch to suit the tube size to be welded and all the operator is required to do is to add or subtract trolleys and/or adjust the spacing between them.

In one simple embodiment the trolleys are linked by means of a length of wire which extends around all of them and clamps them against the tube. This wire can be provided with a tensioning device so as to clamp the trolleys against the tube with sufficient force to enable the drive means on one of the trolleys to rotate the whole assembly by friction between itself and the surface of one of the tubes.

The welding head attached to one of the trolleys can be of any suitable form, a preferred welding head is the one used in the torch described in our copending United Kingdom Patent Application No. 47468/68. This head includes a non-consumable electrode and also has means for providing a flow of inert shielding gas around the arc region during welding, and passages through which cooling water flows. When welding larger diameter tubes where two or more welding passes are required to complete the welding, it may be desirable to have two welding heads, one on one trolley and another on another trolley so that two passes can be run at the same time.

The track on which the various trolleys are guided can conveniently be in the form of a chain which is fitted around one of the tubular members so as to be accurately and evenly spaced from the join. This can be achieved by a suitable jig. The chain can of course be adjusted to suit tubes of a particular outside diameter by adding or subtracting links and then some form of tightening device employed to take up any remaining slack. The trolleys themselves can fit over the chain, the latter engaging in grooves in the trolleys so as to guide them.

DESCRIPTION OF THE DRAWINGS

A welding torch according to the invention will now be described, by way of example, with reference to the accompanying drawings, in which:

FIG. 3 is a plan view;
FIG. 4A is a plan view of the track on which the torch is guided;
FIG. 4B is a side view of this track;
FIG. 7 is a view of the linking arrangement.

DESCRIPTION OF THE PREFERRED EMBODIMENT

Figure 1:
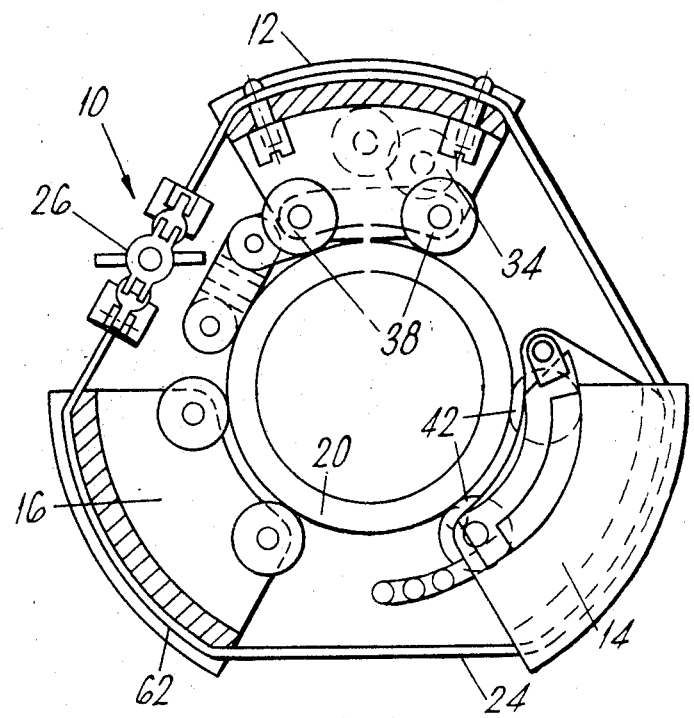
FIG. 1 is an elevation of the torch arrangement.

The welding torch 10 shown in the drawings comprises three trolleys 12, 14 and 16. The trolley 12 is a drive trolley, the trolley 14 carries a welding head 18, while the trolley 16 is an idler trolley.

All the three trolleys are linked together and held against the tubes 20 and 22 to be joined by means of a wire link 24 extending around all the trolleys, the ends of the link being joined together by a tensioning device 26 whose construction will be described in more detail in due course.

The drive trolley 12 has a reduction gearing 28 which receives a drive at its input drive 30 from a flexible drive (not shown) which is in turn driven by a small motor (not shown) positioned remotely of the welding torch 10. The output shaft 22 of the reduction gearing has pinions 34 which mesh with pinions 36 mounted on a common shaft with knurled drive wheels 38 on which the trolley runs around the periphery of the tube 20. The rotation of these knurled drive wheels 38 drives the whole arrangement of the welding torch 10 by means of friction between them and the outer surface of the tube 20. The outer end of the reduction gearing 28 has a small idler wheel 40 to assist in supporting it.

The trolley 14 carries the welding head 18. This trolley has small wheels or rollers 42 on which it runs and which bear against the outer surface of the tube 20.

One suitable form of welding head 18 is described in our United Kingdom co-pending Patent Application No. 47468/68, as shown in FIGS. 8 to 12. It comprises a block 120 of heat resistant and electrically insulating material such as boron nitride generally shaped in the form of a sector of a hollow cylinder and seated in this block in a sector shaped recess 122 is an electrode holder 124, which carries a non-consumable electrode 126 projecting through a bore 128 in the block 120. The electrode holder 124 is made of metal and has a central hollow steam 129 in which the electrode 126 is fixed and held in position by means of a grub screw 130. This arrangement means that the electrode can be readily and simply released, adjusted and replaced if necessary without any dismantling of the head.

Around the stem 129 is provided a passage 132 for the circulation of cooling water between an inlet conduit 134 and an outlet conduit 136. Also attached to the inlet conduit 134 is an electrical supply lead 138 for the welding current supply, this current passing to the electrode.

Another passageway 140 is provided in the holder 124 around the passage 132 for the supply of an inert shielding gas to the region of the arc. This passageway 140 has an inlet 142 and two groups of outlet holes 144. The block 120 has a shallow V-shaped duct 146 formed in the lower side of the recess 122 and the outlet holes 144 lead into this duct so that the shielding gas passes along it and exits through the bore 128.

The electrode holder 124 is fixed to the block by means of a pair of lugs 150 which fit in recesses 152 in the block and these lugs 150 have small holes 154 which are aligned with a bore 156 through the block and a pin 158 passes through the bore 156 and holes 154. The inlet conduit 134, outlet conduit 136 and inlet 142 also pass through the wall of the block.

In order to prevent the material of the block 120 from cracking where it is very close to the very hot arc, a shallow annular recess 159 is provided in the underside of the block around the bore 128 so as to define a relatively thin lip 160.

The head 18 is held in a carrier bracket 170 which has two side arms 172 which clamp around the block 120 in recesses 173. These arms are pivotably held on a threaded support rod 174 by locked nuts 176. The rod 174 is also fixed to the trolley 14. Between the latter and the head is a spring 80 which resiliently urges the head towards the tubes 20 and 22. Correct electrode spacing is maintained by a small roller 182 which is urged against the tubes by the spring 180.

To make a weld cooling water is supplied around the passage 132 and shielding gas to the inlet 142. Then the orbiting of the head 18 by means of the trolley 14 around the tubes is started. Welding current is supplied to strike an arc in the normal way and after just over a complete turn this is gradually reduced to shut-off in the normal way. The orbiting of the body and supply of inert shielding gas can then be stopped and, when the electrode is sufficiently cool, the circulation of cooling water is also stopped. Finally the torch can be removed from around the now welded tubes.

A great advantage of the welding head 18 is its compact size. It can easily have a thickness in the radial sense of as little as seven-sixteenths of an inch. This is due both to its shape and construction and also to the very efficient cooling achieved by the water traversing the passage 132. This compact size enables one to use the torch in situations where there is a bank or row of closely spaced tubes with spacings between adjacent tubes of as little as ½ to ¾ inch.

Because the cooling is very efficient comparatively large welding currents may be used.

In addition the construction of the head promotes a good shielding of the arc region by the inert shielding gas.

The idler trolley 16 consists solely of a frame 44 and small wheels or rollers 46 on which it runs.

Figure 5A:
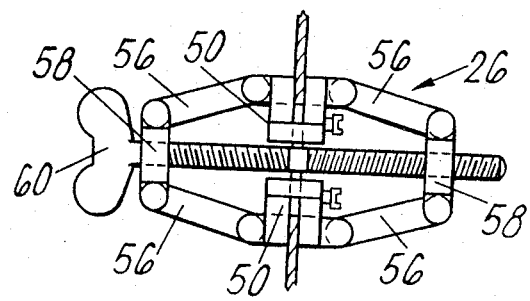
FIG. 5A is a plan view of a tensioning arrangement for the links between the trolleys.
Figure 5B:
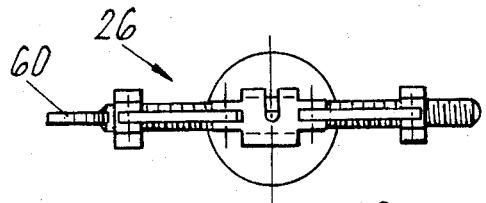
FIG. 5B is a side view of this tensioning arrangement.
Figure 6:
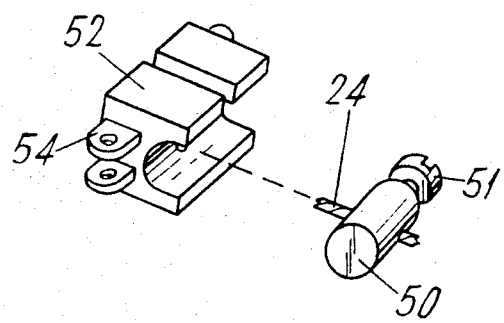
FIG. 6 is an enlarged detail of the end of one of the links.
Figure 8:
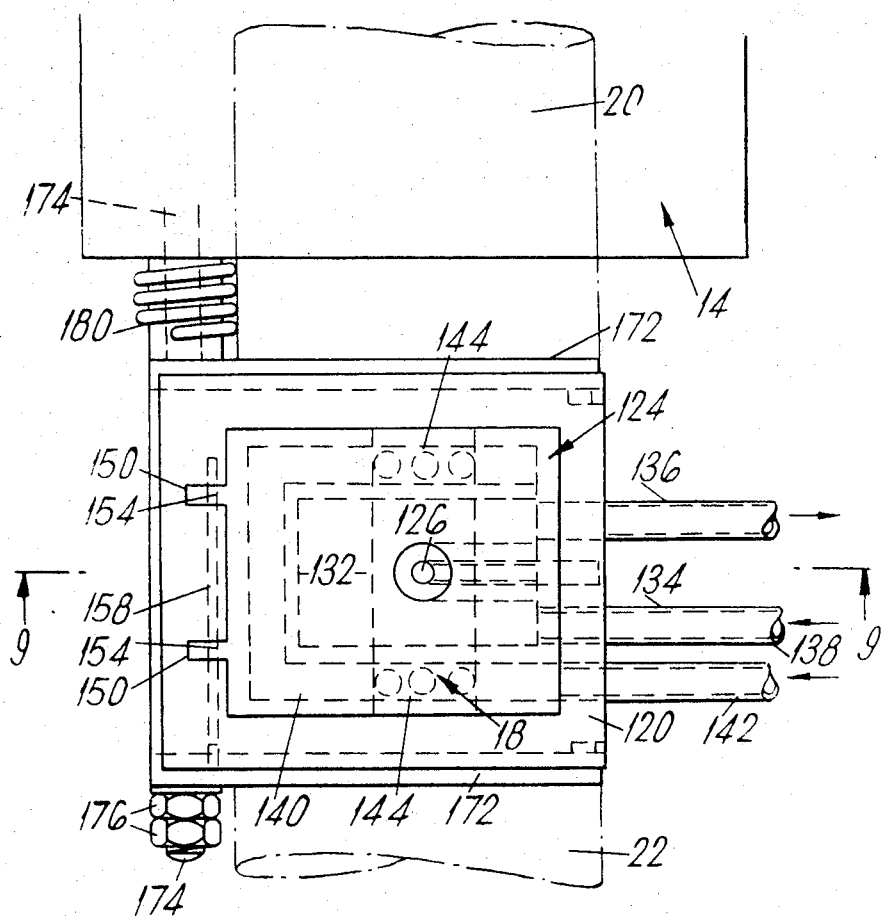
FIG. 8 is a plan view of a welding head carried by one trolley.
Figure 9:
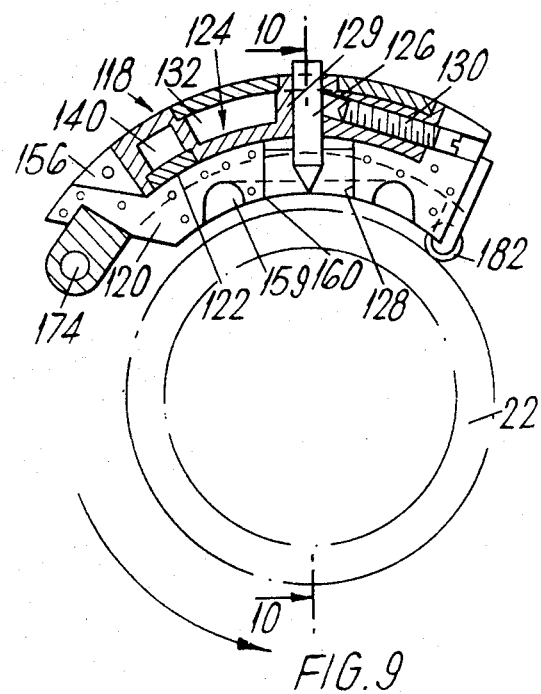
FIG. 9 is a section taken along the line 9—9 of FIG. 8.
Figure 10:
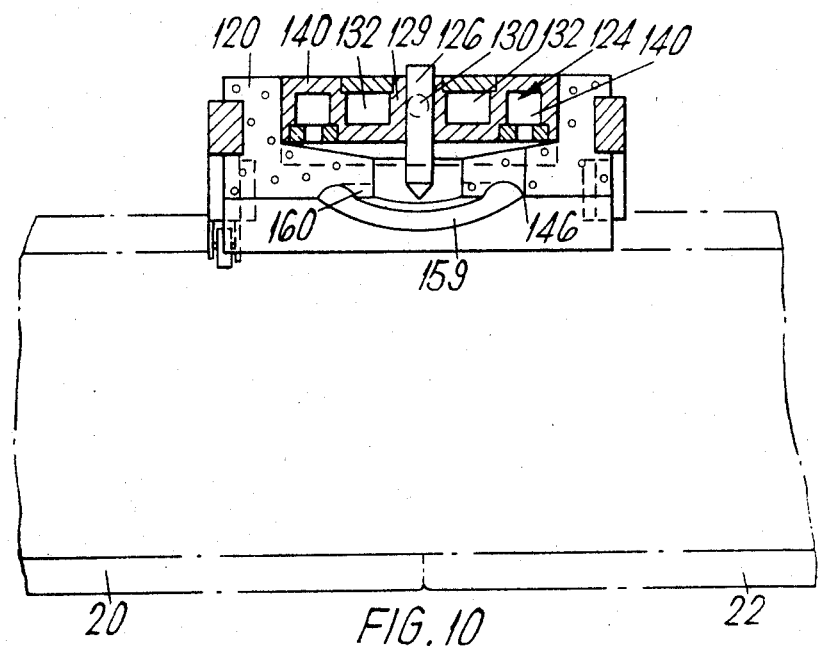
FIG. 10 is a section taken along the line 10—10 of FIG. 9.
Figure 11:
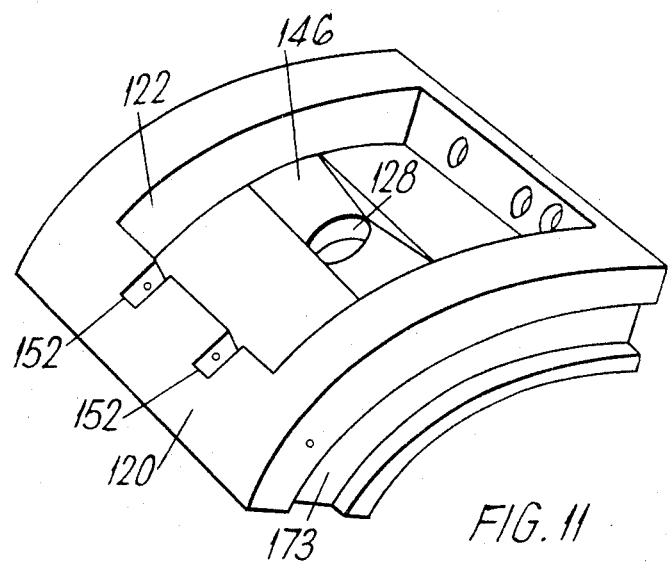
FIGS. 11 and 12 are enlarged details of parts of the head shown in FIG. 8.
Figure 12:
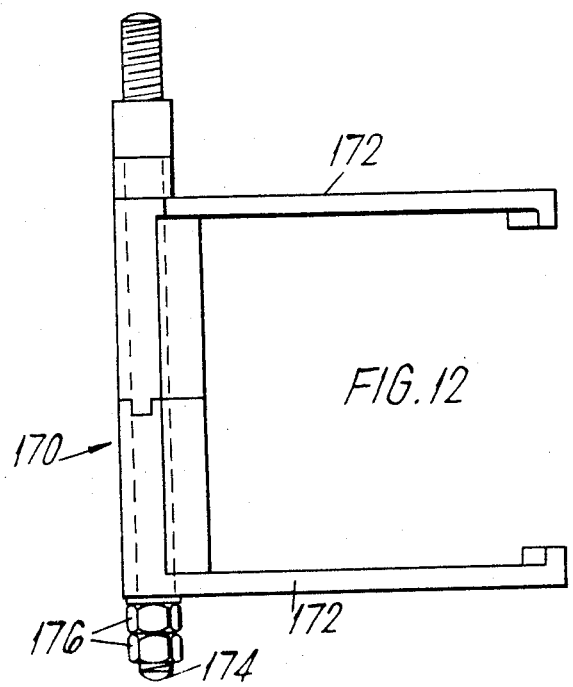

The linking cable 24 is shown in FIG. 7. At its ends small collars 50 are clamped onto the cable and these collars 50 engage in the tensioning device 26 shown in greater detail in FIGS. 5A and 5B. The position of the collars 50 along the cable 24 can be adjusted by unscrewing the small screws 51 so as to adjust the cable roughly to size. The tensioning device 26 comprises clips 52 (FIG. 6) which accommodate the collars. 50. The clips 52 have lugs 54 to which links 56 are pivoted. In turn these links 56 are pivoted at their other ends to threaded members 58 which are threaded onto left and right-hand threaded parts of a screw 60 so that rotation of the screw causes the two threaded members to move either closer together or further apart. The operation of the tensioning device 26 is such that the cable 24 is passed around all the trolleys after its length has been suitably adjusted by adjusting the position of the collars 50 to be of a reasonably tight fit and thereafter the screw 60 is turned in the direction to cause the two members 58 to move further apart and this has the effect of drawing the two clip members and accordingly the collars 50 closing together, so tightening the cable to a desired amount. The tension should be adjusted so that there is sufficient friction between the drive pulleys 38 and the tubes to rotate the whole welding torch when rotation of the drive shaft 30 begins.

Figure 2:
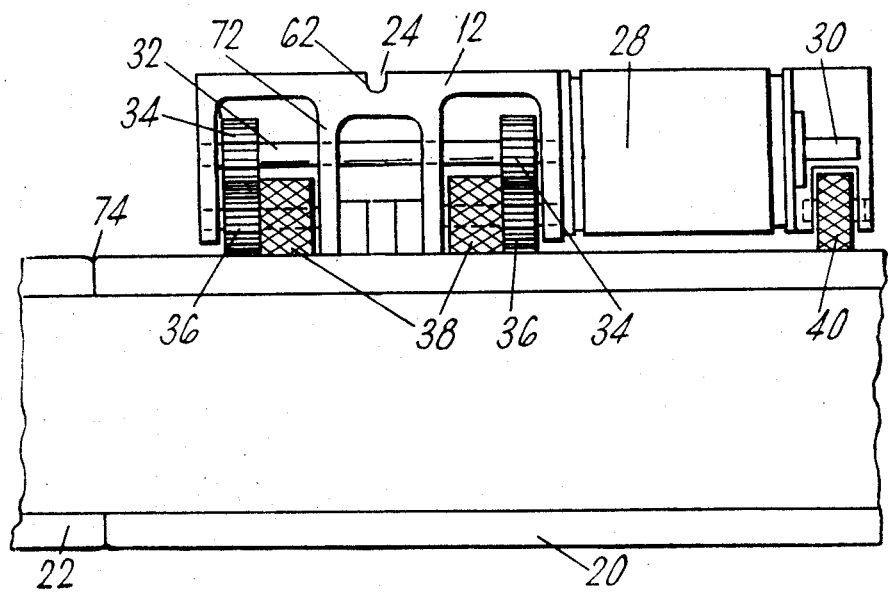
FIG. 2 is a longitudinal section of the torch.

As can be seen from FIGS. 1 to 3 the cable 24 is received in recesses 62 in the outer surfaces of the trolleys.

All the trolleys are guided by means of a chain 70 shown in FIG. 4A and 4B. Each trolley has a recess 72 which fits over the chain guide and the sides of the recess engage the sides of the chain. Initially the chain is fitted on the tube 20 at an accurate spacing from the position of the joint join 74 by means of a jig such that, when the trolleys are in place the electrode of the welding head is in the correct position by screwing in the screws 75 which tension the chain and fix it in place.

In order to butt-weld two tubes, the chain guide 70 is adjusted to be slightly larger than required by adding or subtracting links. Then it is fitted around the tube 20 using a suitable jig to position it so that is accurately spaced from the joint all the way around the tube 20. Then it is fixed in this position by tightening the screws 74.

Thereafter, the operator selects a welding trolley 14 and a driving trolley 12 and possibly one or more idler trolleys 16 depending upon the diameter of the tubes to be joined. The trolleys are fitted over the chain 70 with their grooves 72 straddling it. They are then linked by passing a suitably adjusted length of cable 24 around them engaging their grooves 62 and the collars 50 are engaged in the clips 52. Thereafter, the tensioning device 26 is operated so as to tighten-up the cable 24 sufficiently for the grip between the drive rollers 38 and the surface of the tube to rotate the whole assembly during welding.

The torch is then ready for use, and a welded join is made in the normal way by rotating the whole assembly and striking an arc between the electrode carried by the welding trolley and the join.

As will be appreciated the torch can very quickly and simply be adjusted so as to be suitable for welding tubes of almost any diameter from about 1 inch upwards. Also once the parts of the torch have been adjusted to suit one particular diameter, it is even more readily reassembled for use on another tube of that diameter.

Another important advantage of the torch is its compactness, and in particular, its dimension in the radical sense with respect to a tube is relatively small. Therefore it can be used in places where access is a problem because of the proximity of adjacent tubes of a tube bank. Lastly each component of the torch is readily accessible for repair or a defective component can simply be replaced by a new one.

A lattitude of change, modification and substitution is intended in the foregoing disclosure and in some circumstances some features of the invention will be employed without a corresponding use of other features. Accordingly, it is appropriate that the appended claims be construed broadly, and in a manner consistent with the spirit and scope of the invention herein.

I claim:

1. A welding torch for making circumferential butt-welds between two tubular members comprising:
   a. at least two trolleys arranged to be spaced around the periphery of one of the said tubular members and arranged to run around the outside of one of said tubular members.
   b. a length of wire for linking said trolleys so that they are spaced around the periphery of said one tubular member, said length of wire extending around said trolleys to clam them against said tubular member.
   c. drive means being provided on at least one of said trolleys for driving all of said linked trolleys around the periphery of said tubular member.

d. a welding head carried by at least one of said trolleys, said welding head including an electrode between which and the joint between said tubular members an electric arc can be struck for making said butt-weld.
e. means for supplying welding current to said electrode.
f. a track fitted around one of said tubular members adapted to constrain said trolleys to follow a desired path around said one tubular member such that said electrode is positioned for welding.

2. A welding torch according to claim 1 further comprising a tensionary device in which the ends of said length of wire are held, said tension device being capable of clamping said trolleys against said tubular member with sufficient force to enable said trolley provided with said drive to rotate the said torch by friction between itself and said surface of said tubular member.

3. A welding torch for making circumferential butt-welds between two tubular members comprising:
a. three trolleys arranged to be spaced around the periphery of one of said tubular members, each of said trolleys comprising a platform provided with wheels by which it is able to roll around the outside of one of said tubular members;
b. a length of wire extending tightly around said trolleys so that they are spaced around the said periphery of said tubular member and are clamped against said tubular member;
c. drive means provided on one of said trolleys, said drive means being arranged to rotate the wheels of that trolley and said length of wire clamping said trolleys against said surface such that rotation of said wheels by said drive means causes said linked trolleys to run around said surface of said tubular member;
d. a welding head carried by another of said trolleys, said welding head including a non-consumable electrode between which and said join between said tubular members an electric arc can be struck for making said butt-weld;
e. means for supplying welding current to said electrode, and;
f. a chain fitted around one of said tubular members, grooves being provided in said platforms of said trolleys and said chain fitting within said grooves, said fitting of said chain within said grooves constraining said trolleys to follow a path around said tubular member such that said electrode is correctly positioned for welding.

* * * * *